(12) United States Patent
Lin

(10) Patent No.: US 11,703,217 B1
(45) Date of Patent: Jul. 18, 2023

(54) LIGHT-EMITTING FAN

(71) Applicant: COOLER MASTER CO., LTD., Taipei (TW)

(72) Inventor: Tsung-Wei Lin, Taipei (TW)

(73) Assignee: COOLER MASTER CO., LTD., Taipei (TW)

( * ) Notice: Subject to any disclaimer, the term of this patent is extended or adjusted under 35 U.S.C. 154(b) by 0 days.

(21) Appl. No.: 17/885,176

(22) Filed: Aug. 10, 2022

(30) Foreign Application Priority Data

Jun. 29, 2022 (TW) ................................ 111206899

(51) Int. Cl.
*F21V 33/00* (2006.01)
*F04D 29/00* (2006.01)
*F04D 19/00* (2006.01)

(52) U.S. Cl.
CPC ........ *F21V 33/0096* (2013.01); *F04D 19/002* (2013.01); *F04D 29/005* (2013.01)

(58) Field of Classification Search
None
See application file for complete search history.

(56) References Cited

U.S. PATENT DOCUMENTS

| | | | | |
|---|---|---|---|---|
| 10,969,097 | B2* | 4/2021 | Horng | F21V 3/0625 |
| 11,339,790 | B2* | 5/2022 | Xu | H02K 9/06 |
| 11,486,571 | B2* | 11/2022 | Xu | F21V 33/0096 |
| 2020/0063956 | A1* | 2/2020 | Horng | F04D 29/005 |
| 2022/0057080 | A1* | 2/2022 | Xu | F21V 33/0096 |
| 2022/0128058 | A1* | 4/2022 | Xu | F04D 25/062 |

* cited by examiner

*Primary Examiner* — Juan G Flores
(74) *Attorney, Agent, or Firm* — Maschoff Brennan

(57) ABSTRACT

A light-emitting fan includes a fan frame, an impeller, a circuit board and a light-emitting component. The impeller includes a light guiding hub and a plurality of blades. The light guiding hub is disposed on the fan frame. The light guiding hub has an outer top surface, an outer annular surface, an inner annular surface, and a recess. The outer annular surface is connected to the outer top surface, the inner annular surface faces away from the outer annular surface. The blades are connected to the outer annular surface. The recess is located at the inner annular surface so as to form a light guiding protrusion of the light guiding hub. The circuit board is disposed on the fan frame. The light-emitting component is disposed on the circuit board. Light generated by the light-emitting component is emitted from the outer top surface through the light guiding protrusion.

20 Claims, 10 Drawing Sheets

LIGHT-EMITTING FAN

CROSS-REFERENCE TO RELATED APPLICATIONS

This non-provisional application claims priority under 35 U.S.C. § 119(a) on Patent Application No(s). 111206899 filed in Taiwan, R.O.C. on Jun. 29, 2022, the entire contents of which are hereby incorporated by reference.

TECHNICAL FIELD

The disclosure relates to a fan, more particularly to a light-emitting fan.

BACKGROUND

As the performance of an electronic device increases, more heat is generated therefrom and thus increases the temperature of the electronic device. If the heat is unable to be effectively dissipated, the performance and reliability of the electronic device may be reduced. In order to effectively dissipate the heat generated by the electronic device, a heat dissipation device, such as a fan, is adopted to ensure that the electronic device operates in a suitable temperature.

Some fans not only can cool the electronic device, but also provides a visual effect by emitting light. In general, a light-emitting diode is disposed in such fan, and light emitted by the light-emitting diode is directly incident on a hub of the fan or a decorative board disposed on the hub so as to provide the visual effect. However, due to the characteristic of the light-emitting diode, light emitted by the light-emitting diode focuses on a certain spot of the hub or the decorative board and is unable to be uniformly projected on the hub or the decorative board. Although increasing the distance between the light-emitting diode and the hub or the decorative board can solve the aforementioned issue, the overall size of the fan may be increased accordingly, causing the fan to be difficult to be applied in a thin electronic device. Therefore, how to solve the aforementioned issue is one of crucial topics in this field.

SUMMARY

The disclosure provides a light-emitting fan which allows the light generated by the light-emitting diode to be uniformly illuminate the hub or the decorative board.

One embodiment of the disclosure provides a light-emitting fan. The light-emitting fan includes a fan frame, an impeller, a circuit board and at least one first light-emitting component. The impeller includes a light guiding hub and a plurality of blades. The light guiding hub is rotatably disposed on the fan frame. The light guiding hub has an outer top surface, an outer annular surface, an inner annular surface, and at least one recess. The outer annular surface is connected to the outer top surface, the inner annular surface faces away from the outer annular surface. The plurality of blades are connected to the outer annular surface of the light guiding hub. The at least one recess is located at the inner annular surface so as to form at least one light guiding protrusion of the light guiding hub. The circuit board is disposed on the fan frame. The at least one first light-emitting component is disposed on the circuit board. Light generated by the at least one first light-emitting component is emitted from the outer top surface through the at least one light guiding protrusion of the light guiding hub.

Another embodiment of the disclosure provides a light-emitting fan. The light-emitting fan includes a fan frame, an impeller, a circuit board and at least one first light-emitting component. The impeller includes a light guiding hub and a plurality of blades. The light guiding hub is rotatably disposed on the fan frame. The light guiding hub includes a top plate and an annular side plate, the annular side plate is connected to the top plate, the annular side plate has a recess-protrusion structure at an inner side thereof, and the plurality of blades are connected to the annular side plate. The circuit board is disposed on the fan frame. The at least one first light-emitting component is disposed on the circuit board. Light generated by the at least one first light-emitting component is emitted from the top plate through the recess-protrusion structure of the light guiding hub.

Still another embodiment of the disclosure provides a light-emitting fan. The light-emitting fan includes a fan frame, an impeller, a circuit board and at least one first light-emitting component. The impeller includes a light guiding hub and a plurality of blades. The light guiding hub is rotatably disposed on the fan frame. The light guiding hub includes a top plate and an annular side plate connected to the top plate. Different portions of the annular side plate are different in thickness, and the plurality of blades are connected to the annular side plate. The circuit board is disposed on the fan frame. The at least one first light-emitting component, disposed on the circuit board. Light generated by the at least one first light-emitting component is emitted from the top plate through at least one light guiding protrusion of the light guiding hub.

According to the light-emitting fans as discussed in the above embodiments, the light guiding protrusions are integrally formed on the light guiding hub of the impeller, such that the installation difficulty can be reduced, and the quality for guiding light from the first light guide to the decorative plate can be enhanced. In addition, the relative positions of the light guiding protrusions, the first light-emitting components and the protrusion portions can enable light to be uniformly incident onto the decorative plate, such that the light-emitting fan can uniformly emit light.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
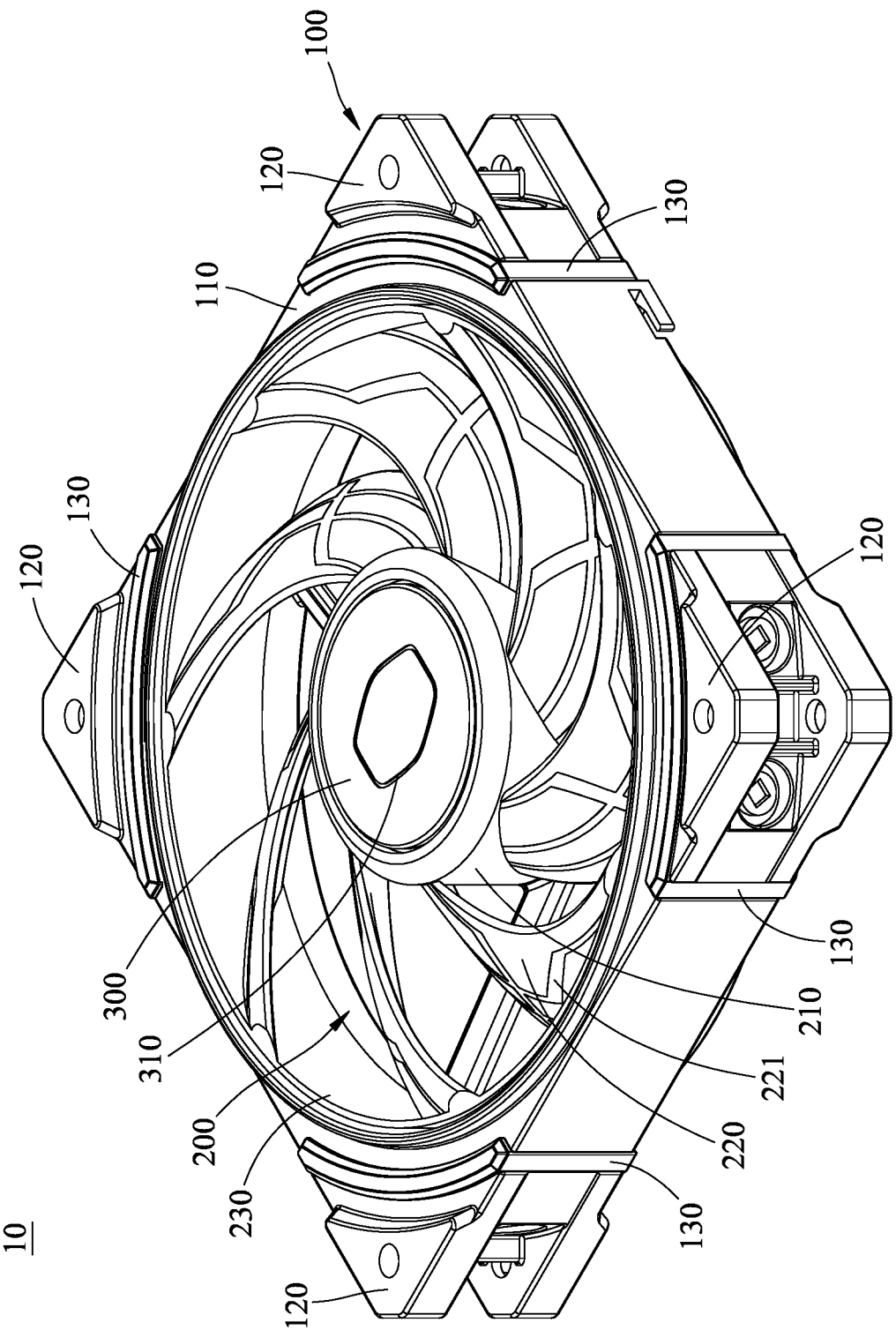
FIG. 1 is a perspective view of a light-emitting fan according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
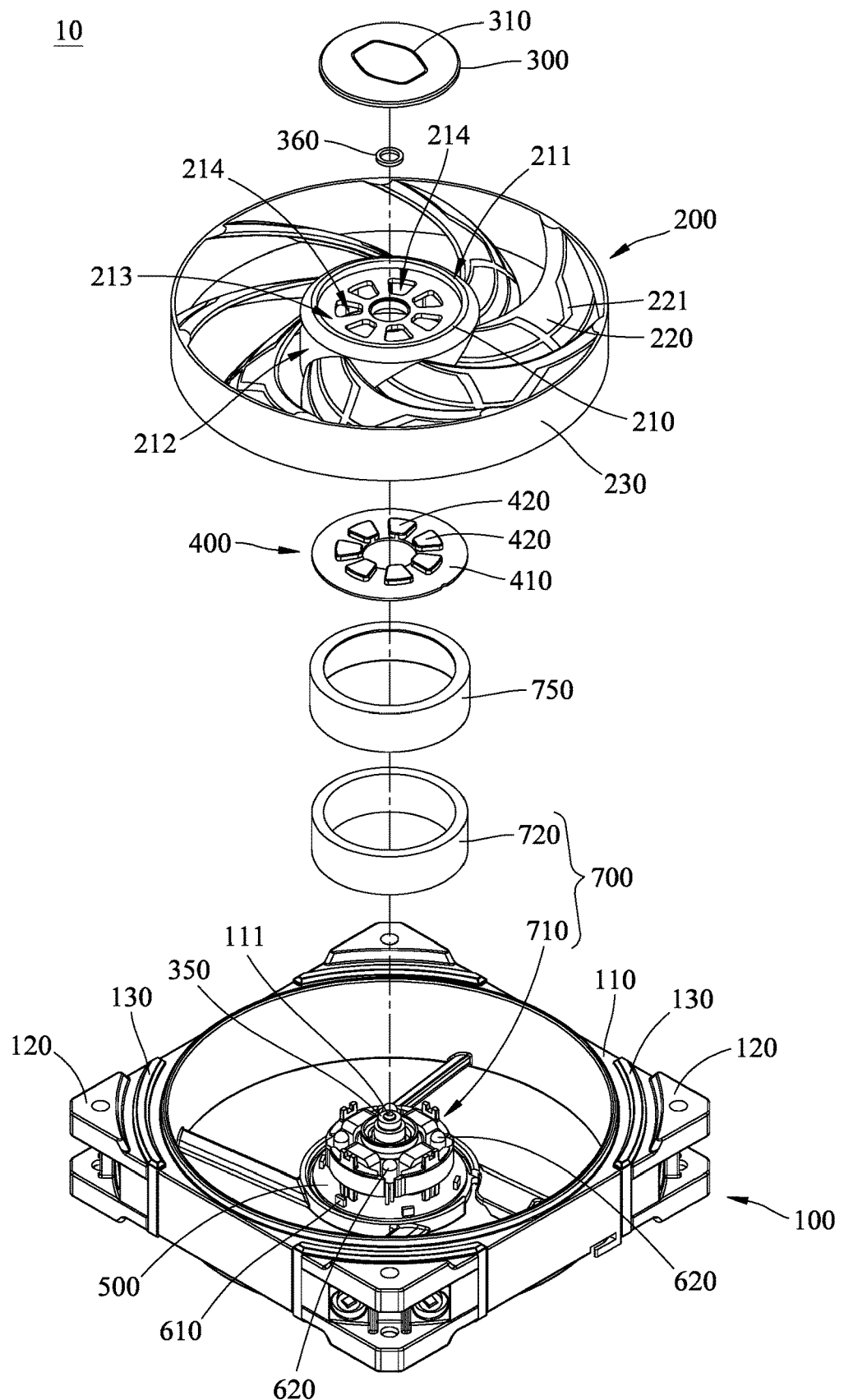
FIG. 2 is an exploded view of the light-emitting fan in FIG. 1.
Figure 3:
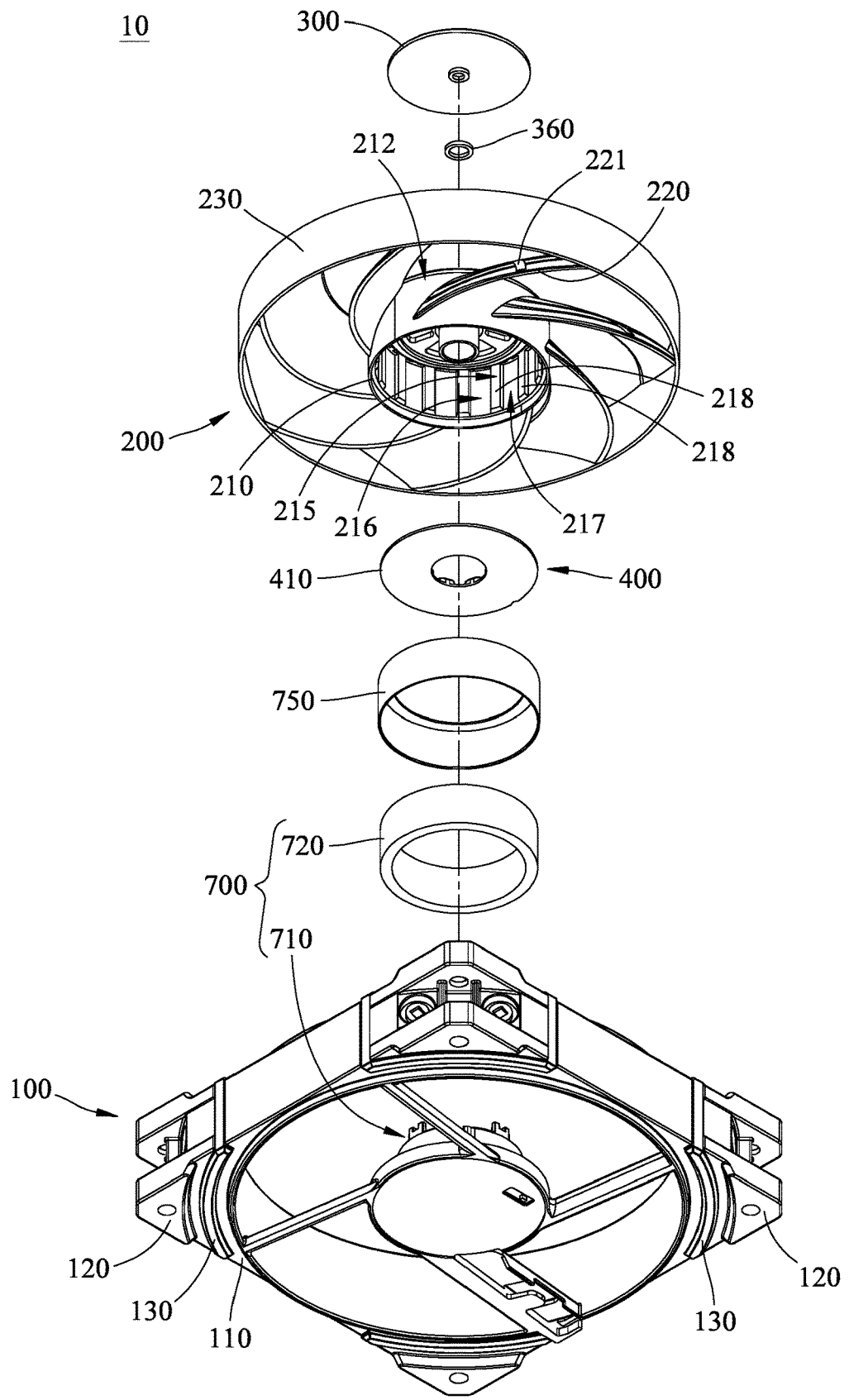
FIG. 3 is another exploded view of the light-emitting fan in FIG. 1.

Refer to FIGS. 1 to 3, where FIG. 1 is a perspective view of a light-emitting fan 10 according to one embodiment of the disclosure, FIG. 2 is an exploded view of the light-emitting fan 10 in FIG. 1, and FIG. 3 is another exploded view of the light-emitting fan 10 in FIG. 1.

In this embodiment, the light-emitting fan 10 includes a fan frame 100, an impeller 200, a decorative plate 300, a first light guide 400, a circuit board 500, a plurality of first light-emitting components 610 and a plurality of second light-emitting components 620. In addition, the light-emitting fan 10 may further include a driving motor 700, a mount frame 750 and a plurality of bearings 800.

The fan frame 100 includes a base 110, a plurality of mount components 120 and a plurality of second light guides 130. The base 110 has a shaft portion 111. The mount components 120 are respectively mounted on different sides of the base 110, and the second light guides 130 are respectively clamped between the base 110 and the mount components 120 and are partially exposed to outside.

Figure 4:
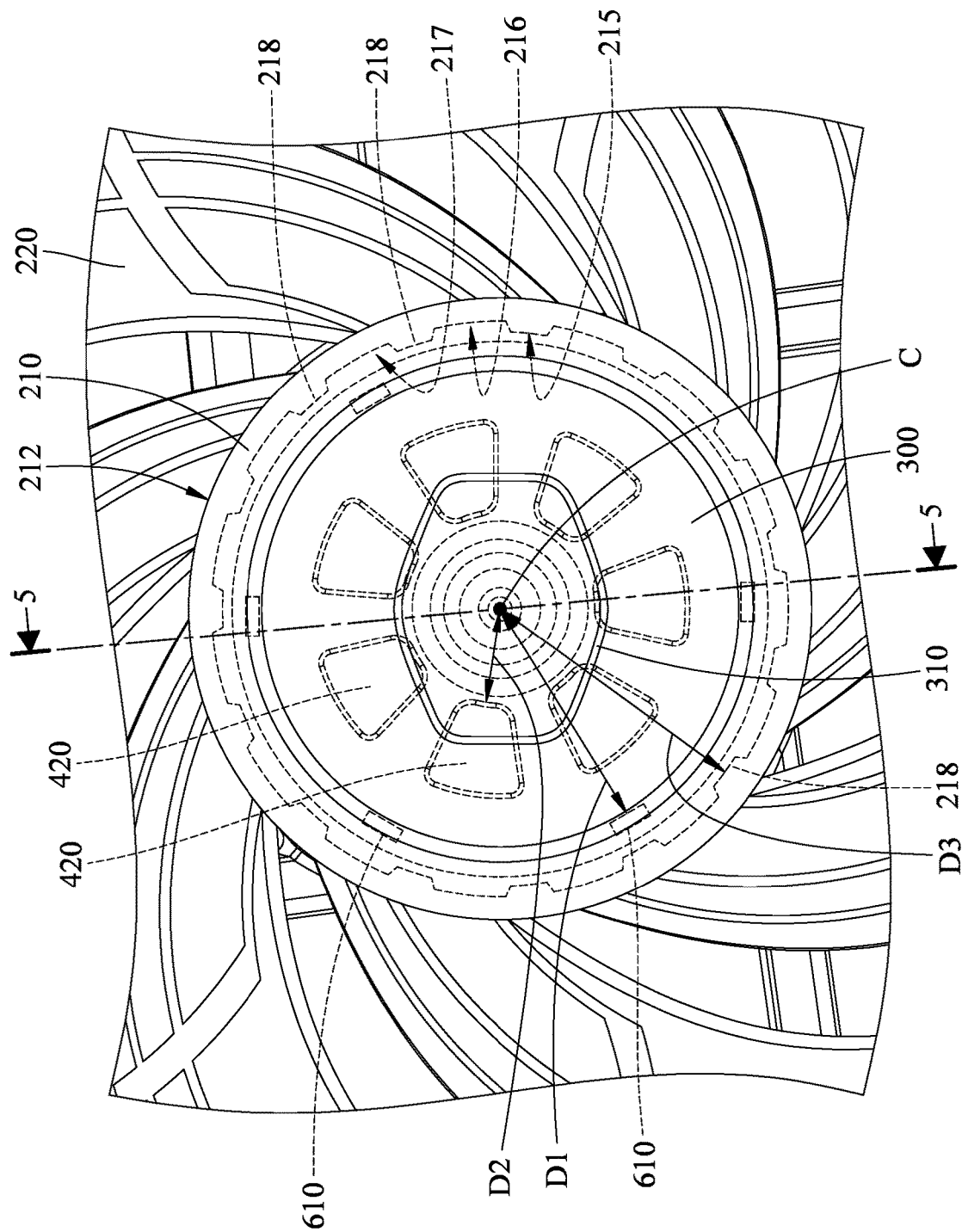
FIG. 4 is a partial and enlarged top view of the light-emitting fan in FIG. 1.
Figure 5:
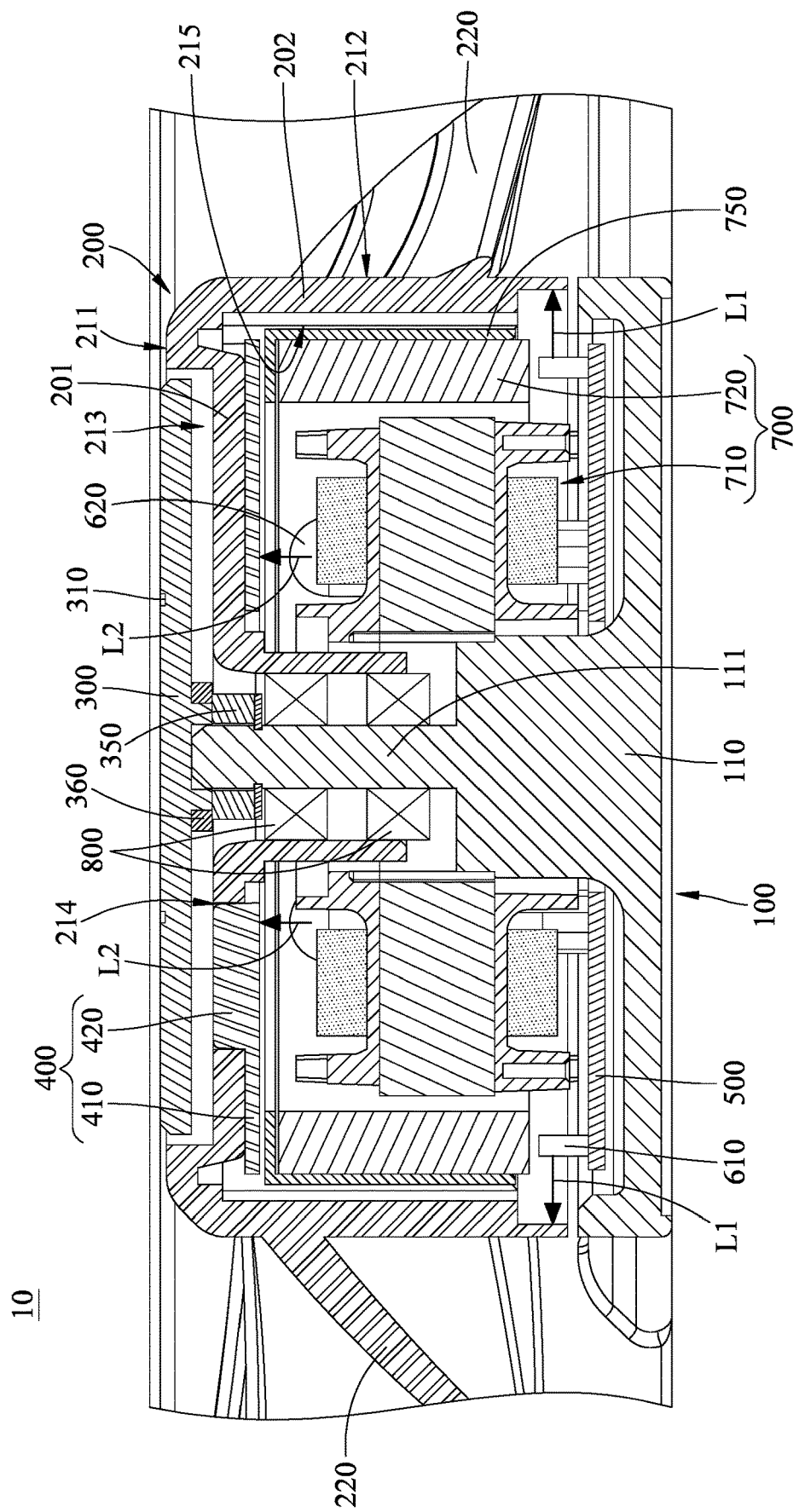
FIG. 5 is a cross-sectional view of the light-emitting fan in FIG. 4 taken along a line 5-5.
Figure 6:
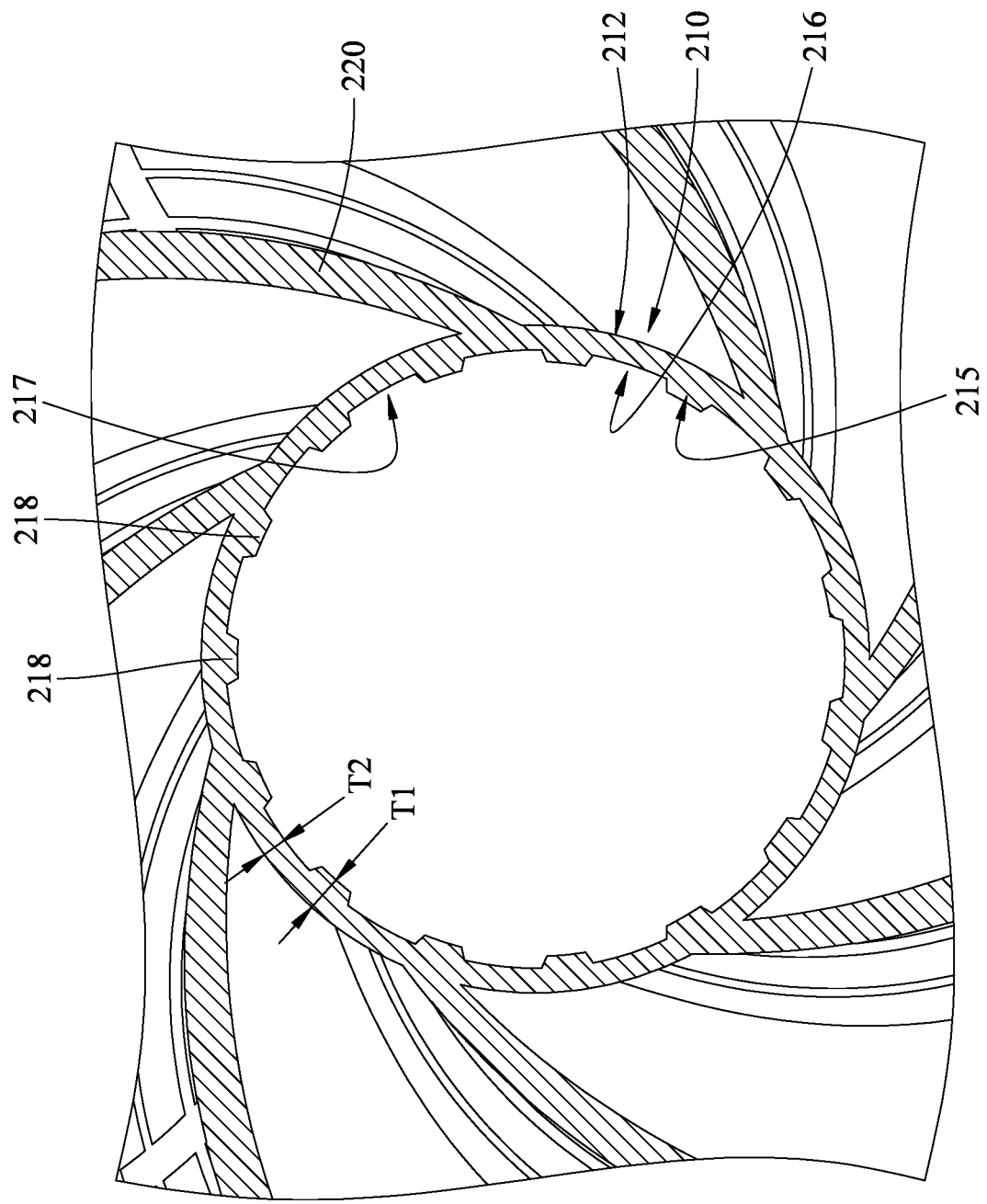
FIG. 6 is a partial cross-sectional view of an impeller of the light-emitting fan in FIG. 2.

Further refer to FIGS. 4 to 6, where FIG. 4 is a partial and enlarged top view of the light-emitting fan 10 in FIG. 1, FIG. 5 is a cross-sectional view of the light-emitting fan 10 in FIG. 4 taken along a line 5-5, and FIG. 6 is a partial cross-sectional view of an impeller 200 of the light-emitting fan 10 in FIG. 2. The impeller 200 includes a light guiding hub 210 and a plurality of blades 220. The light guiding hub 210 is rotatably disposed on the shaft portion 111 of the base 110. The light guiding hub 210 includes a top plate 201 and an annular side plate 202 connected to the top plate 201. The light guiding hub 210 has an outer top surface 211, an outer annular surface 212, an inner annular surface 215, a plurality of through holes 214, a plurality of first recesses 216 and a plurality of second recesses 217. The outer top surface 211 is located at the top plate 201 and exposed to the outside. The outer annular surface 212 and the inner annular surface 215 are respectively located outside and inside of the annular side plate 202. The outer annular surface 212 is connected to the outer top surface 211. The inner annular surface 215 faces away from the outer annular surface 212. The blades 220 are connected to the outer annular surface 212 of the light guiding hub 210. The through holes 214 are located at the outer top surface 211. The first recesses 216 and the second recesses 217 are located at the inner annular surface 215 so as to form a plurality of light guiding protrusions 218 of the light guiding hub 210. Therefore, a thickness T2 of a portion of the annular side plate 202 with one recess is smaller than a thickness T1 of a portion of the annular side plate 202 with one light guiding protrusion 218, such that the annular side plate 202 of the light guiding hub 210 has different thicknesses in different portions thereof; that is, the light guiding protrusions 218 integrally formed by making different portions of the annular side plate 202 of the light guiding hub 210 have different thicknesses can reduce the installation difficulty and enhance the quality for guiding light from the first light guide 400 to the decorative plate 300. In addition, the light guiding hub 210 further has an accommodation recess 213 located at the outer top surface 211. In this embodiment, the light guiding hub 210 may be made of polycarbonate material and white powder.

In this embodiment, the impeller 200 may further include a silencer ring 230. The silencer ring 230 is connected to sides of the blades 220 located opposite to the light guiding hub 210 for reducing noise generated by the impeller 200 during operation. Note that the silencer ring 230 is optional and may be omitted in some other embodiments.

Note that the quantity of the through holes 214 is not restricted in the disclosure and may be modified to be one.

The decorative plate 300 is located in the accommodation recess 213. The installation of the decorative plate 300 will be described in later paragraphs. The decorative plate 300 has a light permeable pattern 310. The light permeable pattern 310 is, for example, a hexagonal pattern, but the disclosure is not limited thereto; in some other embodiments, the light permeable pattern may be a trademark or other desired mark. The decorative plate 300 is, for example, made of a transparent or translucent and light-permeable material, such as acrylic, glass or plastic material, and the light permeable pattern 310 is formed by partially masking an upper portion of the decorative plate 300.

The first light guide 400 includes a plate portion 410 and a plurality of protrusion portions 420. The protrusion portions 420 protrude from one side of the plate portion 410. The protrusion portions 420 are respectively located in the through holes 214. In this embodiment, the first light guide 400 is, for example, made of polycarbonate material and light diffusion powder, and the light guiding hub 210 may be made of polycarbonate material and white powder.

The circuit board 500 is disposed on the base 110 of the fan frame 100. The first light-emitting components 610 are, for example, light-emitting diodes. The first light-emitting components 610 are disposed on the circuit board 500. Light L1 generated by the first light-emitting components 610 not only travels to the blades 220 through the light guiding protrusions 218 of the light guiding hub 210, but also partially travels to the outer top surface 211 through the light guiding protrusions 218 of the light guiding hub 210. In addition, a distance D1 from each first light-emitting component 610 to the axis C of the light guiding hub 210 is greater than a distance D2 from each protrusion portion 420 to the axis C of the light guiding hub 210, and a distance D3 from each light guiding protrusion 218 to the axis C of the light guiding hub 210 is greater than the distance D1 from each first light-emitting component 610 to the axis C of the light guiding hub 210. The second light-emitting component 620 are, for example, light-emitting diodes. The second light-emitting component 620 are disposed on the circuit board 500. Light L2 generated by the second light-emitting components 620 travels to the decorative plate 300 through the protrusion portions 420. The protrusion portions 420 allows the light L2 to illuminate the decorative plate 300 more uniformly.

The driving motor 700 includes a stator 710 and a rotor 720. The stator 710 is mounted on the fan frame 100. The rotor 720 is mounted on the light guiding hub 210 via the mount frame 750, and the mount frame 750 is in contact with the inner annular surface 215. The stator 710 is, for example, provided with coils. The rotor 720 is, for example, a permanent magnet. The induction between the stator 710 and the rotor 720 generates a magnetic field for rotating the rotor 720.

Note that the quantities of the first light-emitting components 610, the second light-emitting components 620, and the bearings 800 are not restricted in the disclosure and may be modified to be one in some other embodiments.

In this embodiment, the light guiding protrusions 218 are formed by the recesses inwardly recessed from the inner annular surface 215 of the annular side plate 202 of the light guiding hub 210, but the disclosure is not limited thereto; in some other embodiments, the light guiding protrusions may be formed as protrusions outwardly protruding from the inner annular surface of the annular side plate of the light guiding hub. In this embodiment, the light guiding protrusions 218 are formed at the circular inner annular surface 215, but the disclosure is not limited thereto; in some other embodiments, the light guiding protrusions may be formed at an inner annular surface having hexagonal, octagonal or another geometrical shape.

Figure 7:
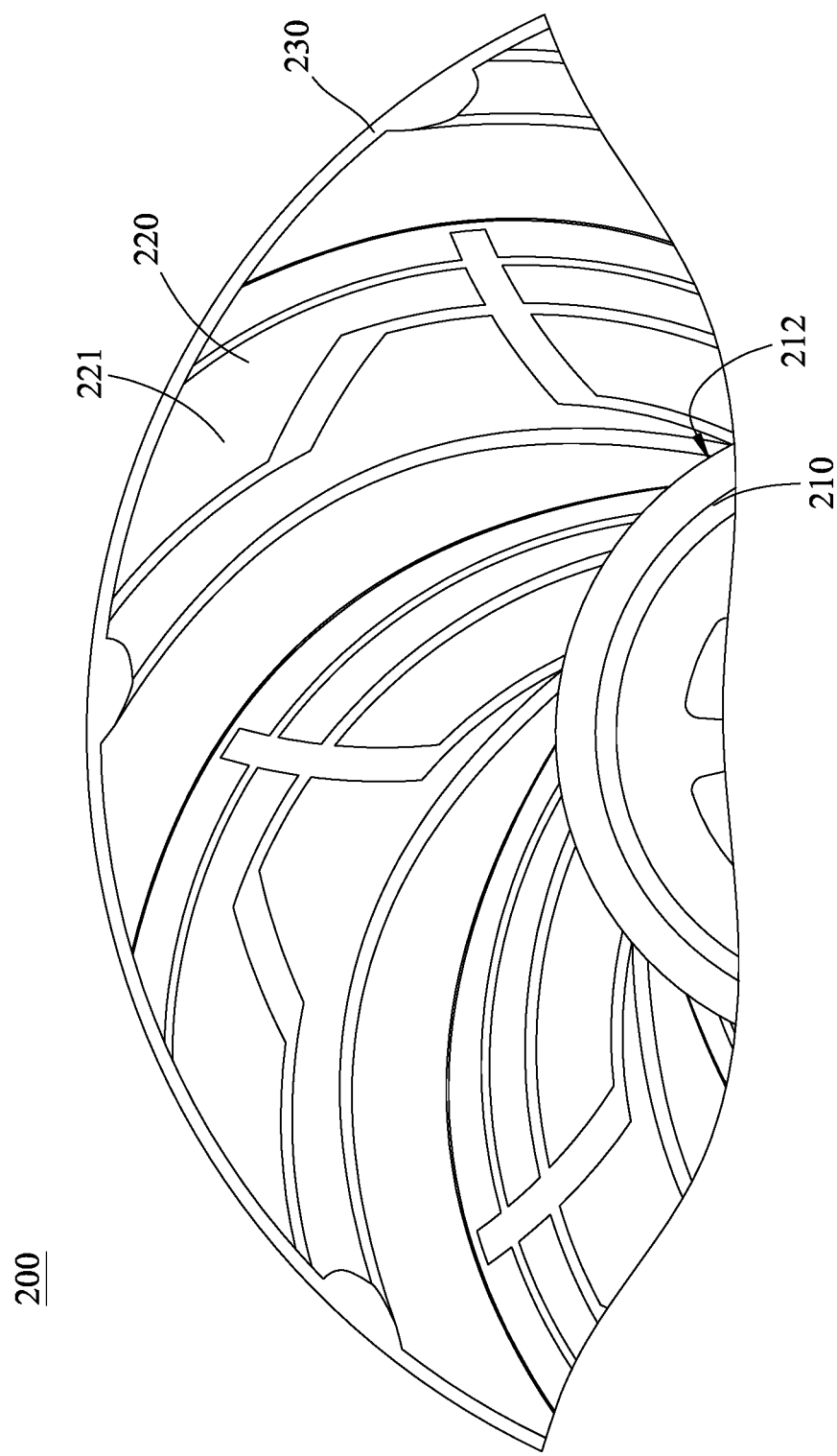
FIG. 7 is a partial and enlarged top view of the impeller of the light-emitting fan in FIG. 1.

Referring to FIG. 7, FIG. 7 is a partial and enlarged top view of the impeller 200 of the light-emitting fan 10 in FIG. 1. In this embodiment, the blades 220 has a light guide characteristic, and each of them has an optical pattern 221. The light generated by the first light-emitting components 610 is configured to be emitted from the optical patterns 221 of the blades 220 through the light guiding hub 210.

Figure 8:
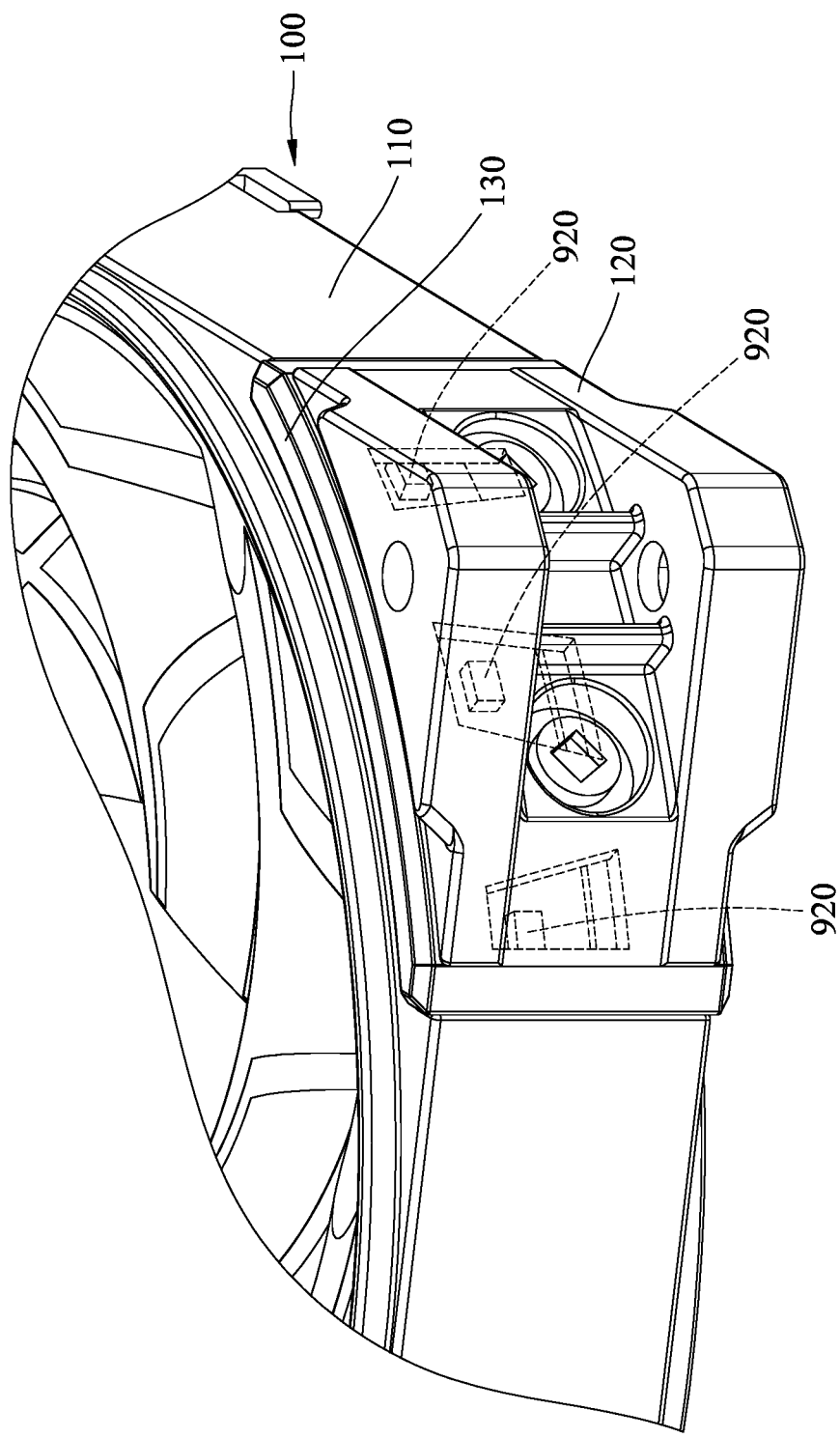
FIG. 8 is a partial and enlarged perspective view of the light-emitting fan in FIG. 1.
Figure 9:
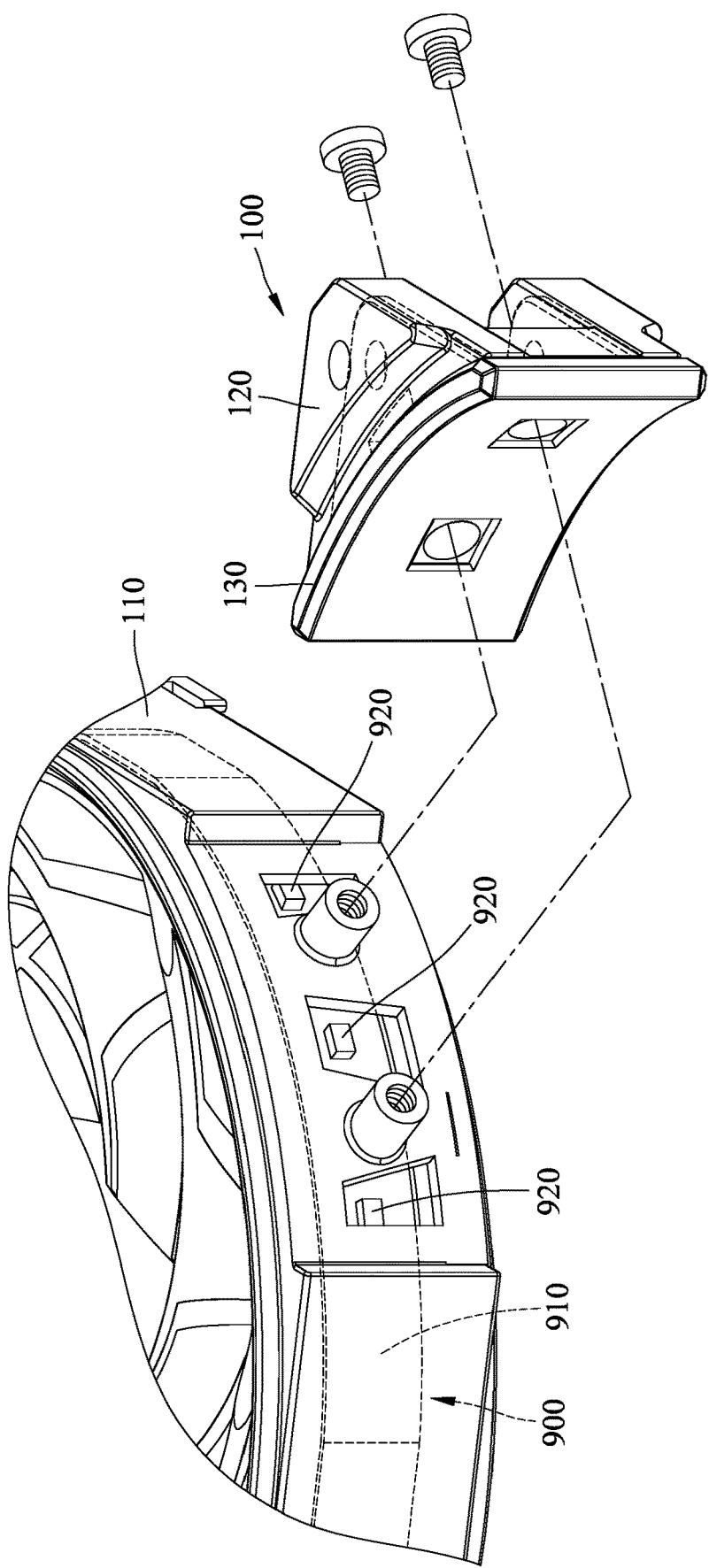
FIG. 9 is an exploded view of the light-emitting fan in FIG. 8.

Refer to FIGS. 8 and 9, where FIG. 8 is a partial and enlarged perspective view of the light-emitting fan 10 in FIG. 1, and FIG. 9 is an exploded view of the light-emitting fan 10 in FIG. 8. In this embodiment, the light-emitting fan 10 may further include a third light-emitting component 900. The third light-emitting component 900 is disposed on the base 110 and includes an annular substrate 910 and a plurality of light sources 920. The light sources 920 are, for example, light-emitting diodes and respectively correspond to the second light guides 130, such that light generated by the light sources 920 is emitted from the second light guides 130.

Figure 10:
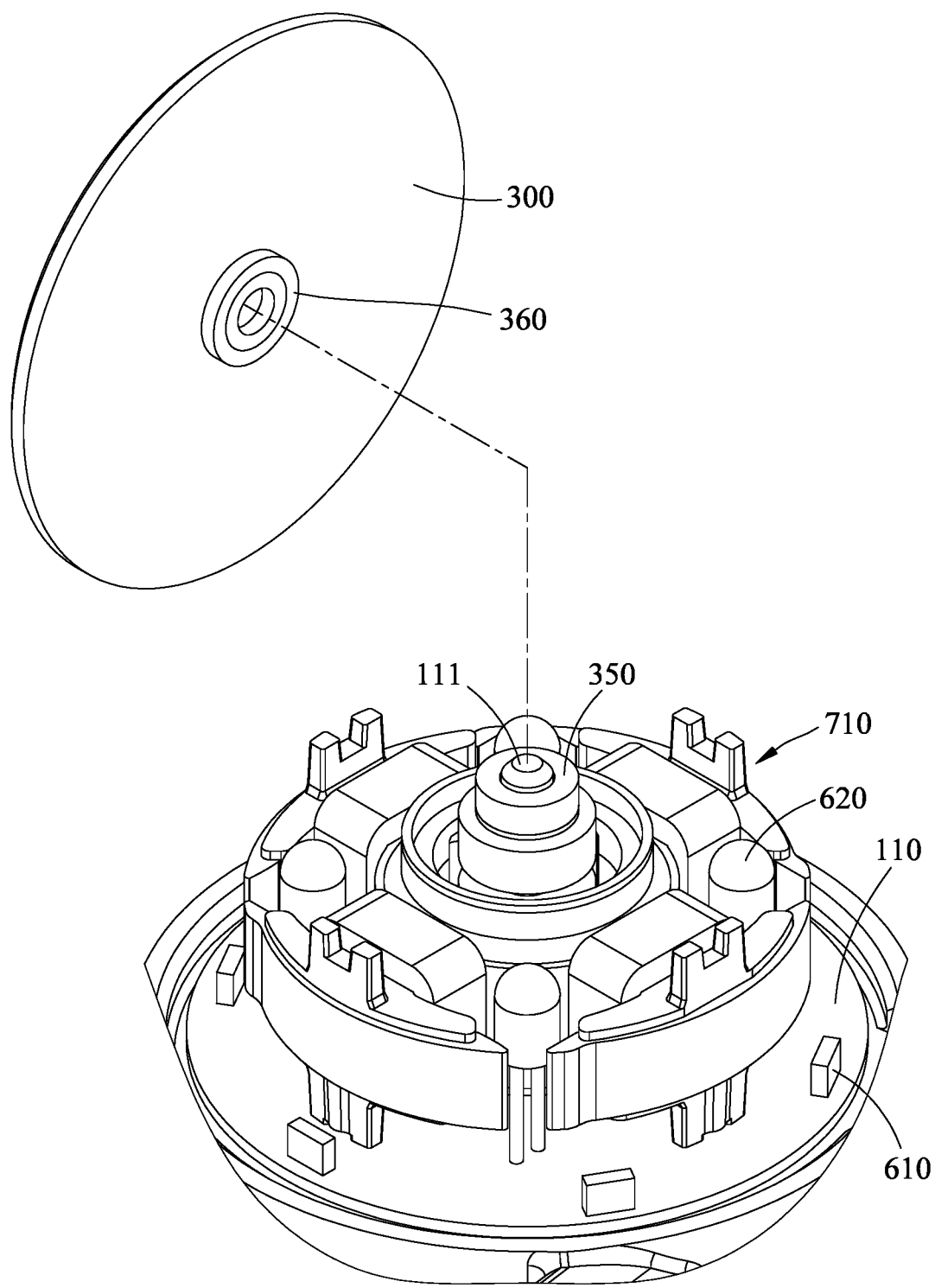
FIG. 10 is a partial exploded view of the light-emitting fan in FIG. 1.

Refer to FIG. 10, where FIG. 10 is a partial exploded view of the light-emitting fan 10 in FIG. 1. In this embodiment, the light-emitting fan 10 may further include a first magnetic component 350 and a second magnetic component 360. The first magnetic component 350 is disposed on the shaft portion 111 of the base 110, and the second magnetic component 360 is disposed on the decorative plate 300. The second magnetic component 360 is removably attached to the first magnetic component 350, such that the decorative plate 300 is installed on the shaft portion 111 of the base 110 via a magnetic attraction manner. Therefore, the installation and removal of the decorative plate 300 can be rapidly finished.

According to the light-emitting fan as discussed in the above embodiment, the light guiding protrusions are integrally formed on the light guiding hub of the impeller, such that the installation difficulty can be reduced, and the quality for guiding light from the first light guide to the decorative plate can be enhanced. In addition, the relative positions of the light guiding protrusions, the first light-emitting components and the protrusion portions can enable light to be uniformly incident onto the decorative plate, such that the light-emitting fan can uniformly emit light.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A light-emitting fan, comprising:
    a fan frame;
    an impeller, comprising a light guiding hub and a plurality of blades, wherein the light guiding hub is rotatably disposed on the fan frame, the light guiding hub has an outer top surface, an outer annular surface, an inner annular surface, and at least one recess, the outer annular surface is connected to the outer top surface, the inner annular surface faces away from the outer annular surface, the plurality of blades are connected to the outer annular surface of the light guiding hub, the at least one recess is located at the inner annular surface so as to form at least one light guiding protrusion of the light guiding hub;
    a circuit board, disposed on the fan frame; and
    at least one first light-emitting component, disposed on the circuit board;
    wherein light generated by the at least one first light-emitting component is emitted from the outer top surface through the at least one light guiding protrusion of the light guiding hub;
    wherein the light-emitting fan further comprises a first light guide and a second light-emitting component, wherein the light guiding hub has at least one through hole, the first light guide is inserted into the at least one through hole of the light guiding hub, the second light-emitting component is disposed on the circuit board, and light generated by the second light-emitting component travels through the first light guide;
    wherein the quantity of the at least one through hole is plural, the first light guide comprises a plate portion and a plurality of protrusion portions, the plurality of protrusion portions protrude from a side of the plate portion, the plurality of protrusion portions are respectively located in the through holes, a distance from the at least one first light-emitting component to an axis of the light guiding hub is greater than a distance from each of the plurality of protrusion portions to the axis of the light guiding hub.

2. The light-emitting fan according to claim 1, further comprising a decorative plate, wherein the light guiding hub further has an accommodation recess located at the outer top surface, the decorative plate is located in the accommodation recess, and the decorative plate has a light permeable pattern.

3. The light-emitting fan according to claim 2, wherein light generated by the second light-emitting component travels to the decorative plate through the first light guide.

4. The light-emitting fan according to claim 3, further comprising a third light-emitting component, wherein the fan frame comprises a base, a plurality of mount components and a plurality of second light guides, the base has a shaft portion, the light guiding hub is rotatably disposed on the shaft portion of the base, the plurality of mount components are respectively mounted on different sides of the base, the plurality of second light guides are respectively clamped between the base and the plurality of mount components and partially exposed to outside, the third light-emitting component is disposed on the base and comprises an annular substrate and a plurality of light sources, the plurality of light sources respectively correspond to the plurality of second light guides, and light generated by the plurality of light sources is emitted to outside through the plurality of second light guides.

5. The light-emitting fan according to claim 1, wherein the impeller further comprises a silencer ring, and the silencer ring is connected to sides of the plurality of blades located opposite to the light guiding hub.

6. The light-emitting fan according to claim 1, wherein each of the plurality of blades has a light guide characteristic and has an optical pattern, and the light generated by the at least one first light-emitting component is configured to be emitted from the optical patterns of the plurality of blades through the light guiding hub.

7. The light-emitting fan according to claim 1, further comprising a driving motor and a mount frame, wherein the driving motor comprises a stator and a rotor, the stator is mounted on the fan frame, the rotor is mounted on the light guiding hub via the mount frame, and the mount frame is in contact with the inner annular surface.

8. The light-emitting fan according to claim 1, wherein a distance from the at least one light guiding protrusion to the axis of the light guiding hub is greater than the distance from the at least one first light-emitting component to the axis of the light guiding hub.

9. A light-emitting fan, comprising:
a fan frame;
an impeller, comprising a light guiding hub and a plurality of blades, wherein the light guiding hub is rotatably disposed on the fan frame, the light guiding hub comprises a top plate and an annular side plate, the annular side plate is connected to the top plate, the annular side plate has a recess-protrusion structure at an inner side thereof, and the plurality of blades are connected to the annular side plate;
a circuit board, disposed on the fan frame; and
at least one first light-emitting component, disposed on the circuit board;
wherein light generated by the at least one first light-emitting component is emitted from the top plate through the recess-protrusion structure of the light guiding hub;
wherein the light-emitting fan further comprises a first light guide and a second light-emitting component, wherein the light guiding hub has at least one through hole, the first light guide is inserted into the at least one through hole of the light guiding hub, the second light-emitting component is disposed on the circuit board, and light generated by the second light-emitting component travels through the first light guide;
wherein the quantity of the at least one through hole is plural, the first light guide comprises a plate portion and a plurality of protrusion portions, the plurality of protrusion portions protrude from a side of the plate portion, the plurality of protrusion portions are respectively located in the through holes, a distance from the at least one first light-emitting component to an axis of the light guiding hub is greater than a distance from each of the plurality of protrusion portions to the axis of the light guiding hub.

10. The light-emitting fan according to claim 9, further comprising a driving motor and a mount frame, wherein the driving motor comprises a stator and a rotor, the stator is mounted on the fan frame, the rotor is mounted on the light guiding hub via the mount frame, and the mount frame is in contact with the annular side plate.

11. The light-emitting fan according to claim 9, further comprising a decorative plate, wherein the light guiding hub further has an accommodation recess, the decorative plate is located in the accommodation recess, and the decorative plate has a light permeable pattern.

12. The light-emitting fan according to claim 11, wherein light generated by the second light-emitting component travels to the decorative plate through the first light guide.

13. The light-emitting fan according to claim 12, further comprising a third light-emitting component, wherein the fan frame comprises a base, a plurality of mount components and a plurality of second light guides, the base has a shaft portion, the light guiding hub is rotatably disposed on the shaft portion of the base, the plurality of mount components are respectively mounted on different sides of the base, the plurality of second light guides are respectively clamped between the base and the plurality of mount components and partially exposed to outside, the third light-emitting component is disposed on the base and comprises an annular substrate and a plurality of light sources, the plurality of light sources respectively correspond to the plurality of second light guides, and light generated by the plurality of light sources is emitted to outside through the plurality of second light guides.

14. The light-emitting fan according to claim 9, wherein each of the plurality of blades has an optical pattern, and the light generated by the at least one first light-emitting component is configured to be emitted from the optical patterns of the plurality of blades through the light guiding hub.

15. A light-emitting fan, comprising:
a fan frame;
an impeller, comprising a light guiding hub and a plurality of blades, wherein the light guiding hub is rotatably disposed on the fan frame, the light guiding hub comprises a top plate and an annular side plate connected to the top plate, different portions of the annular side plate are different in thickness, and the plurality of blades are connected to the annular side plate;
a circuit board, disposed on the fan frame; and
at least one first light-emitting component, disposed on the circuit board;
wherein light generated by the at least one first light-emitting component is emitted from the top plate through at least one light guiding protrusion of the light guiding hub;
wherein the light-emitting fan further comprises a first light guide and a second light-emitting component, wherein the light guiding hub has at least one through hole, the first light guide is inserted into the at least one through hole of the light guiding hub, the second light-emitting component is disposed on the circuit board, and light generated by the second light-emitting component travels through the first light guide;
wherein the quantity of the at least one through hole is plural, the first light guide comprises a plate portion and a plurality of protrusion portions, the plurality of protrusion portions protrude from a side of the plate portion, the plurality of protrusion portions are respectively located in the through holes, a distance from the at least one first light-emitting component to an axis of the light guiding hub is greater than a distance from each of the plurality of protrusion portions to the axis of the light guiding hub.

16. The light-emitting fan according to claim 15, further comprising a driving motor and a mount frame, wherein the driving motor comprises a stator and a rotor, the stator is mounted on the fan frame, the rotor is mounted on the light guiding hub via the mount frame, and the mount frame is in contact with the annular side plate.

17. The light-emitting fan according to claim 15, further comprising a decorative plate, wherein the light guiding hub further has an accommodation recess, the decorative plate is located in the accommodation recess, and the decorative plate has a light permeable pattern.

18. The light-emitting fan according to claim 17, wherein light emitted by the second light-emitting component travels to the decorative plate through the first light guide.

19. The light-emitting fan according to claim 18, further comprising a third light-emitting component, wherein the fan frame comprises a base, a plurality of mount components and a plurality of second light guides, the base has a shaft portion, the light guiding hub is rotatably disposed on the shaft portion of the base, the plurality of mount components are respectively mounted on different sides of the base, the plurality of second light guides are respectively clamped between the base and the plurality of mount components and partially exposed to outside, the third light-emitting component is disposed on the base and comprises an annular substrate and a plurality of light sources, the plurality of light sources respectively correspond to the plurality of second light guides, and light generated by the plurality of light sources is emitted to outside through the plurality of second light guides.

20. The light-emitting fan according to claim 15, wherein each of the plurality of blades has an optical pattern, and the light generated by the at least one first light-emitting component is configured to be emitted from the optical patterns of the plurality of blades through the light guiding hub.

\* \* \* \* \*